9211X
McLaughlin & Hill,
Wood Plane Attachment.
Patented Oct. 28, 1835.
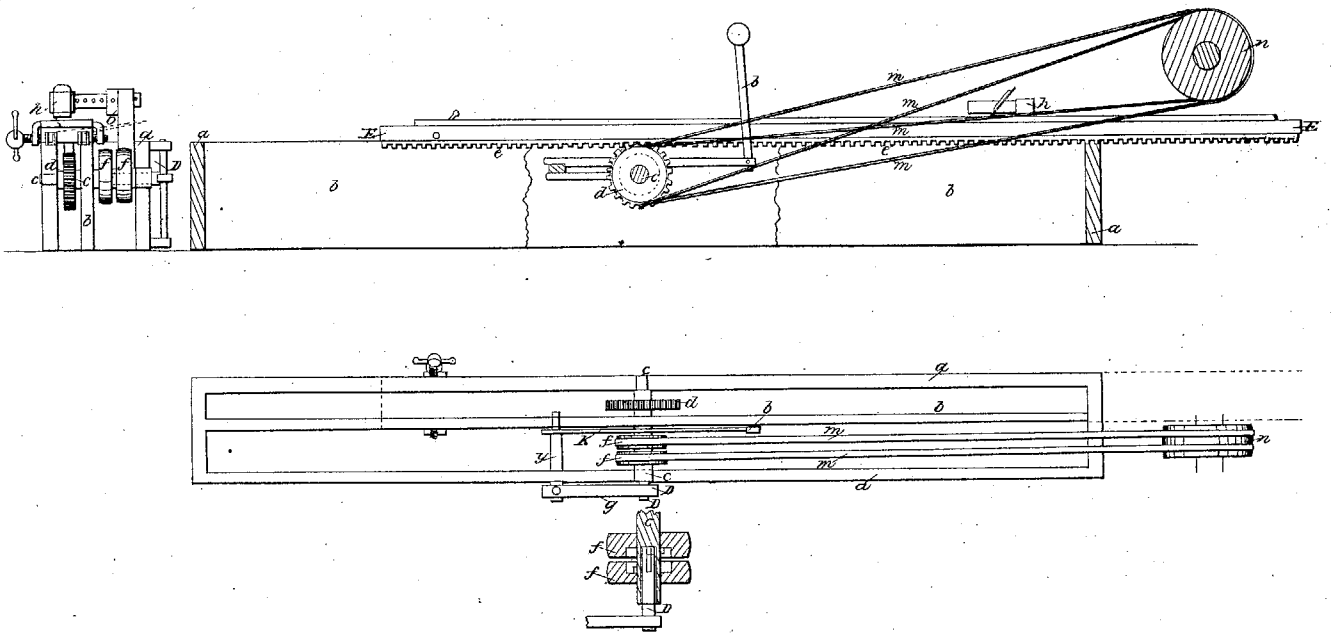
AM. PHOTO-LITHO. CO. N.Y. (OSBORNE'S PROCESS.)

Ira McLaughlin and Hiram Hill of Sunderland Vermont
9211X

Letters Patent.

The schedule referred to in these Letters Patent and making part of the same containing a description in the words of the said Ira McLaughlin and Hiram Hill themselves of their improvements in the Planing Machine.

To all to whom these presents shall come.

Be it known that we Ira McLaughlin and Hiram Hill of Sunderland in the county of Bennington and State of Vermont, have invented a new and useful improvement in the planing Machine, and that the following is a full and exact description of the construction and operation of the said machine as invented or improved by us.

An oblong case or box is to be formed of such dimensions as may best suit the convenience of the constructor the height being about the same as that usually given to the ordinary carpenters bench.

A Division in this box which answers as the reception for the machinery as well as for working on extends from one end to the other, intended as a support to the axles &c. It may be only sufficiently wide to support the plank intended for the bench, and in about the centre of its length is placed a main axis, extending from one side to the other, and revolving thereon; also passing through the division, on one end of this is placed a small cog wheel, within the enclosure and next to the division intended to work a rack above it secured on the bottom of the bench top which is thereby moveable. on the other side of the division are placed two loose pullies leaving a small space between them and said division the pullies occupy the remainder of the length of the shaft. They work side by side close to each other and have a portion of these adjoining surfaces removed for a short space around the axle making a hollow, intended in each for the reception of a pin or catch, one on each side of said axle, which axle is made hollow, through the extent of the out-side pulley and as far into the second or next to the division as the hollowed part thereof extends; at this point a mortise is cut quite through the axle wide & long enough to extend from said point to the same in the outside pulley.

[illegible] [illegible]

9211X

Through the hollow shaft is passed a rod or bar up to the termination where a pin is passed
through it and projects up through the mortise far enough to catch into the pins or catches
in the pullies, so that by pushing this rod and pin into the hollow shaft, the mortise
allows it to press close against the hollowed inner part of the pulley side and consequently it
must come in contact with the pins there placed, which will cause the wheel or pulley to
become as it were fixed for the time, & therefore revolve with the shaft; a pin or collar
being placed behind it to prevent its giving to the pressure of the rod further than necessary The rod being withdrawn as far as the pins in the hollow of the outside pulley
sets it in motion and releases the first & so alternately, the object of which motion will
appear hereafter. A collar between the outside pulley on the shaft & the
side of the case keeps it to its place. The rod or bar in the hollow shaft projects
a little longer than it beyond the case side, & then has a groove or shoulder turned in
it to receive the end of a bar of wood which is let on to this shoulder [illegible]
& then runs horizontally back, a short distance beyond or without the case side, when
it is lapped on another cross bar passing at right angles from it quite through the
whole width of the case and a short space beyond it where the size is much reduced
commencing from the side of the division next to the pullies so as to form a shoul-
-der there against the opening in said division made for it to pass through.

Through the lap mentioned a pivot rod is passed, & also through two other
cross bars below the first which rests on the top one of these loosely; the lower
one being at the bottom of the case leaves space between them, to steady the
pivot bar; and in this manner is formed a rectangular lever, its fulcrum
being the pivot, and the short arm let on the collar or groove in the rod
when set in motion by application to the other end, must move it either
in or out, & consequently with it the cross pin at the end, by which means the
motion is alternated between the pullies. This application is made by
means of a horizontal bar let on at one end to the long leg of the rectangular
lever, at the shoulder already mentioned where it passes through the division
from whence it extends in front over the axle, occupying the space already men-
tioned there left (between the inner pulley and the side of the division) far enough to be
inserted by a mortise and loose tenon and pivot into the lower end of a long
lever standing upwards parallel with the perpendicular division, though in
an oblique line forwards, the top being loaded with a heavy knob & the [illegible]

fulcrum consisting of a pivot passing through it & the division & side furthest from the pullies and beneath the main axle. A moveable pin projecting from the top plank of the bench at the side strikes when in motion against this lever which rests in contact with said side and thrusts it forward, when the lead weight carries it over until it is again struck by the other moveable pin (there being two) when it is sent back a-gain and consequently the motion is communicated by the short leg to the rod in the hollow shaft, thereby fixing first one pulley and then the other, as it were to the hol-low shaft, and causing it to revolve with the pulley in gear. & as these pullies are driven in opposite directions by means of a straight broad band to one, & a cross one to the other, running over a drum (revolving on an axle in front of the case set in motion by water or other power) the small cog wheel on the axle must give the same motion by means of the rack to the moveable bench top, this is kept in its position by a groove on its under edge next to the division sliding on two plates fastened on the top thereof & projecting into the groove, another groove is also formed on the opposite edge to fit on the top of the side piece, and a perpendicular plank hanging down there steadies it. A Steele Iron at the top and side ends & [illegible] winch screw or dogs at the other serve to secure the timber. A strong bar is supported by two uprights in a position parallel with the bench & on the side next to the pullies near the end generally occupied by the work-man from this a bar projects over the bench top and close to the upper surface & the position may be changed by numerous holes along it — against this bar the plane is placed in about the position it would be held by the workman & as the revolution of one pulley carries the timber forward, the next pulley brings it back, while the planing continues during that motion; when it changes with the pulley again and so on;

In order to throw the machine out of gear the rectangular lever is so much withdrawn as to leave the pin at the end of the rod or bar in the hollow shaft exactly between the two pullies and consequently unconnected with either. In this position it is retained by means of a short bar on the side beyond which the long leg projects, having at one end a screw or pivot & at the other a groove or notch to fit on the small end which is thus held securely — we would in some cases fasten the plane by bolts or screws on its side thereby presenting the cutting edge to the side of the timber, which

9211X would then rest upon the bench with the end against the bar over it so that the plane would move and pass under the bar while the timber would be steady. What we claim as our invention and not previously known and for which we ask Letters Patent, is the peculiar manner in which we communicate the alternate motion backwards or forwards to the moveable bench top by means of the arrangement of the pulleys hollow shaft and rod. Also secondly the rectangular lever and the means of adapting (by the oblique one) the alternate motion by the pulleys to the shaft and consequently the bench top according to the method already set forth which any competent machinist will be able to distinguish from other methods or machines now in use, as the characteristic arrangement of ours.

The alternate motion given to the bench we do not claim but merely ~~that~~ the manner of producing it according to the construction claimed for. In testimony that the above is an exact description of our improvement as invented by us, we have hereunto set our hands this third day of October, Eighteen hundred & thirty two.

Witnesses
Robt. Clarke
Henry Stone

Ira McLaughlin
Hiram Hill

1665 ...

Exd
ChW.